No. 810,453. PATENTED JAN. 23, 1906.
J. H. WOLF.
LAND ROLLER.
APPLICATION FILED MAR. 28, 1905.
2 SHEETS—SHEET 1.
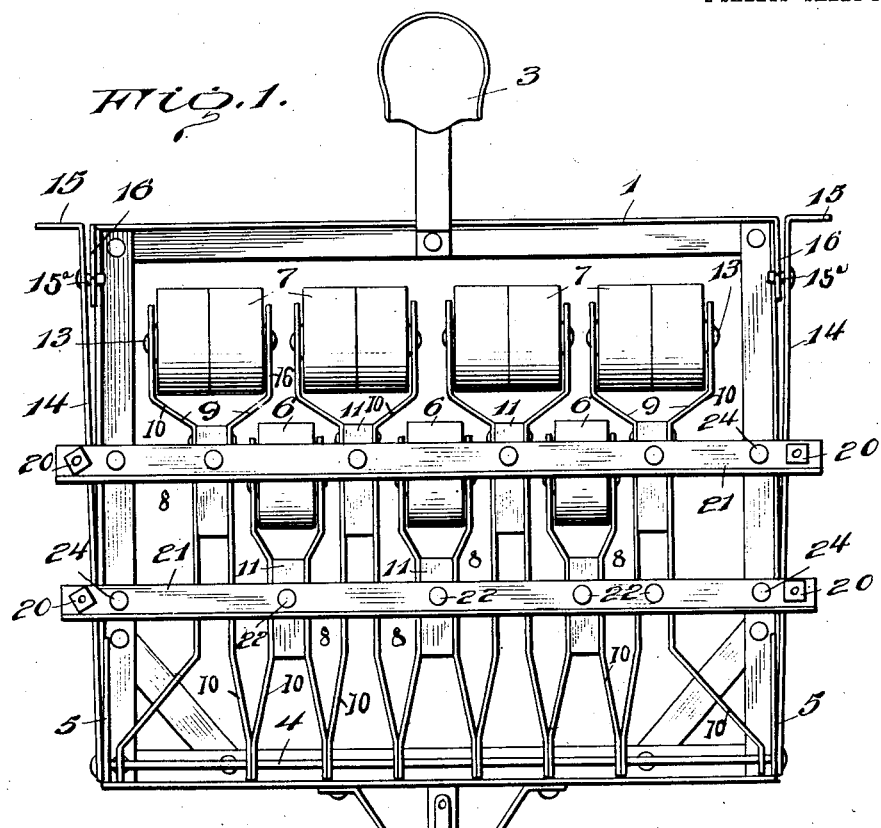
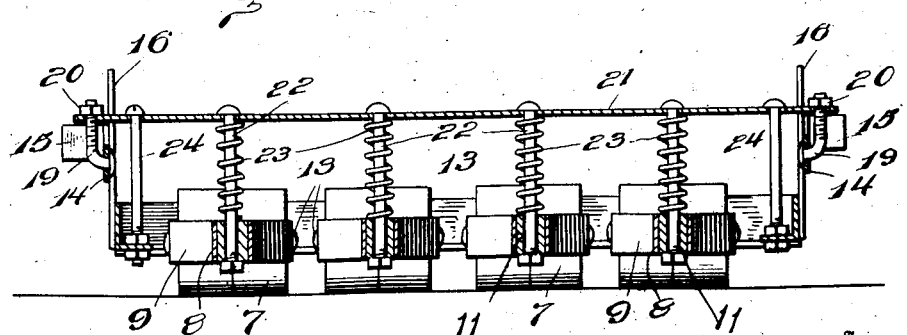
Witnesses
Inventor
John H. Wolf
By R. W. & B. Lacey, Attorneys No. 810,453.
PATENTED JAN. 23, 1906.
J. H. WOLF.
LAND ROLLER.
APPLICATION FILED MAR. 28, 1905.
2 SHEETS—SHEET 2.
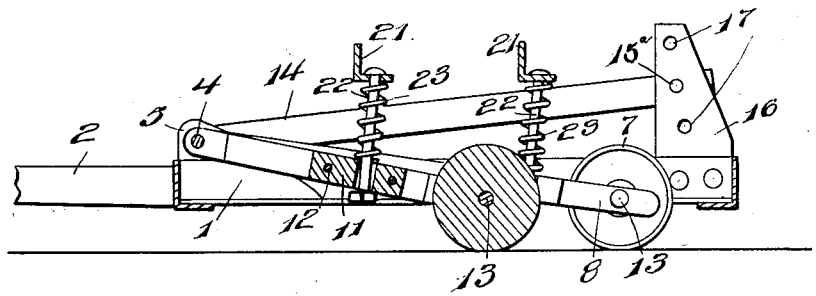
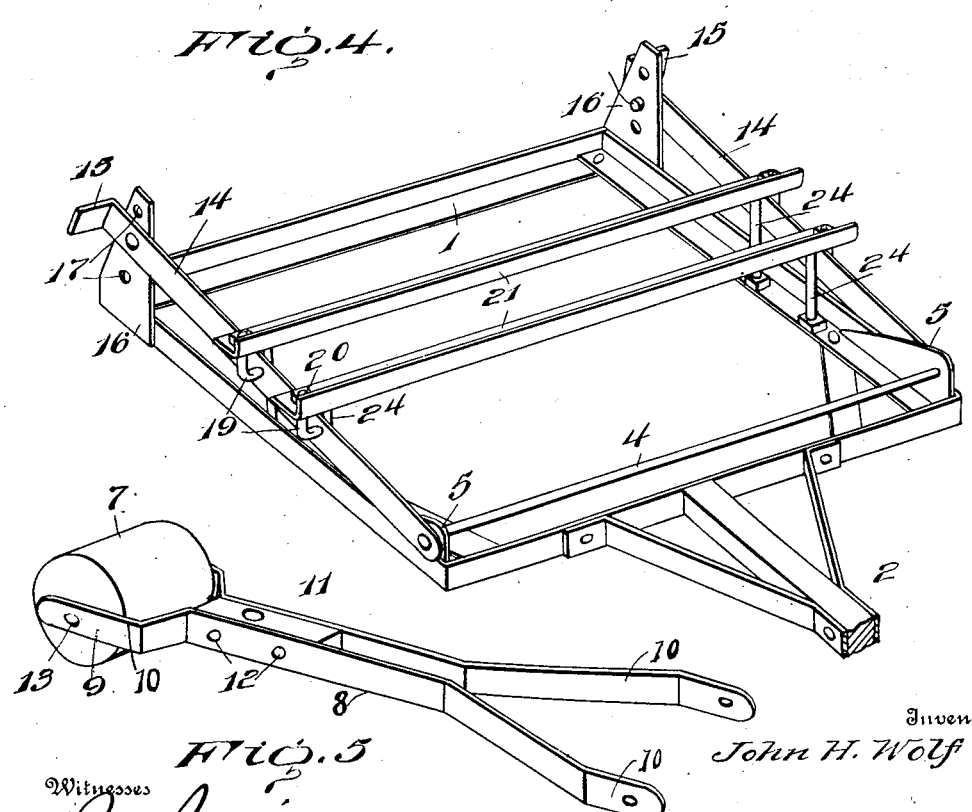
Witnesses
Inventor
John H. Wolf
By
Lacey, Attorneys

UNITED STATES PATENT OFFICE.

JOHN H. WOLF, OF COTTAGEGROVE, WISCONSIN.

LAND-ROLLER.

No. 810,453.  Specification of Letters Patent.  Patented Jan. 23, 1906.

Application filed March 28, 1905. Serial No. 252,555.

*To all whom it may concern:*

Be it known that I, JOHN H. WOLF, a citizen of the United States, residing at Cottagegrove, in the county of Dane and State of Wisconsin, have invented certain new and useful Improvements in Land-Rollers, of which the following is a specification.

This invention appertains to that type of agricultural implements designed for reducing soil by the use of a structure embodying a plurality of reducing-rollers which are advanced over the land.

The essential feature of the invention is comprised in the special arrangement of the rollers, the mounting thereof in the frame of the implement, and peculiar connections for adjusting the rollers to actuate the same under variation in conditions of service.

For a full description of the invention and the merits thereof and also to acquire a knowledge of the details of construction of the means for effecting the result reference is to be had to the following description and accompanying drawings, in which—

Figure 1 is a plan view of an implement embodying the invention. Fig. 2 is a transverse sectional view. Fig. 3 is a longitudinal vertical sectional view. Fig. 4 is a perspective view of the frame, the rollers and the supporting members being omitted. Fig. 5 is a detail perspective view of a roller and a supporting member therefor.

Corresponding and like parts are referred to in the following description and indicated in all the views of the drawings by the same reference characters.

Describing specifically the construction of the implement, a suitable frame 1 of approximately rectangular form is used, a tongue 2 being projected from the front of the frame for attachment of the draft-animals, said tongue being suitably braced. A seat 3 is carried by the rear transverse bar of the frame 1, and the driver of the implement is seated thereon when the same is in use. A transverse pintle-rod 4 is arranged longitudinally of the front bar of the frame 1 and is carried in suitable brackets 5, attached to the front extremities of the side bars of said frame. A plurality of rollers 6 and 7 operate between the sides of the frame 1, and said rollers are mounted in supporting members 8, pivoted at the front ends thereof to the pintle-rod 4. The supporting members of the rollers 6 and 7 comprise spaced bars 9, the opposite ends of the bars of each supporting member being curved outwardly from each other, as shown at 10. Blocks 11 are disposed at points between the ends of the bars 9 of each member 8, and transverse fastenings 12 pass through these blocks to the bars 9, securing the same together. The front extremities of the bars 9 are provided with apertures through which the pintle-rod 4 passes, and the rear extremities of the said bars are likewise provided with apertures forming bearings for short shafts 13, upon which rollers 6 and 7 are mounted. The rollers 6 are located nearer the front of the implement than the rollers 7, and said rollers 7 are substantially as wide as the space between the several rollers 6 in order that as the implement advances the ground will be thoroughly reduced, since the said rollers pass over every portion of the land. The rollers 7 are quite a little wider than the rollers 6, as shown most clearly in the drawings.

The supporting-bars 8 of the rollers 7 are of course somewhat longer than the similar members carrying the rollers 6, said rollers 6 operating in the space between adjacent space-bars of the supporting members 8 of the rear rollers 7.

The rollers above described are yieldably supported in the frame 1 of the implement, and for this purpose adjusting-levers 14 are located at opposite sides of the frame, being arranged longitudinally to the side bars thereof. The adjusting-levers 14 are pivoted at their front ends to the end portions of the pintle-rod 4. The rear extremities of the said levers 14 are projected laterally to form handles 15 to facilitate ready manipulation of these levers under working conditions. Standards 16 project upwardly from the rear end portions of the sides of the frame 1, and these standards are provided with a plurality of vertically-arranged openings 17. A lug 15ª, extending laterally from the rear end portion of each adjusting-lever 14, is adapted to be received in a selected one of the openings 17 to hold the adjusting-lever at a predetermined adjustment with relation to the frame. Between the front and rear ends of the adjusting-levers 14 are located two outwardly and upwardly curved members 19, having the upper portions thereof threaded to receive nuts 20. Transverse bars 21 extend across the frame 1 above the supporting members 8, and these bars are provided at the ends thereof with openings through which the threaded members 19 pass. The bars 21 are not only connected with the adjusting-levers 14, but bolts 24 pass through these bars to the side bars of the frame 1, forming guide members to direct the movement of the bars 21 vertically. Springs 23 are interposed between the blocks 11 of the supporting members 8 and the bars 21, said bars 21 being arranged above the transversely-mounted blocks of the supporting members 8 of the rollers 6 and 7. It will thus be noted that the rollers 6 and 7 are yieldably mounted in the frame 1 and are adapted for flexible movement vertically in said frame. Further, the rollers 6 and 7 are individually mounted and are adapted to yield when the implement passes over inequalities in the ground, or said rollers will move into depressions under the spring-pressure of the parts 23. The bolts 22 pass through the blocks 11 and the bars 21, and the springs 23 are coil-springs through which the bolts pass in order to prevent displacement of the springs. It will be understood that the tension of the springs 23 may be increased or decreased by lowering or raising the adjusting-levers 14, and this may be done very quickly in a manner which will be readily apparent. Further, the springs 23 may also be adjusted permanently by moving the nuts 20 in the desired direction, the adjustment of the tension of the springs in the words above set forth being very advantageous in adapting the implement for use in reducing soils of different character.

Having thus described the invention, what is claimed as new is—

1. In an implement of the class described, the combination of a frame, supporting members pivoted at the front ends thereof to the frame, rollers carried by the rear ends of the supporting-bars aforesaid, bars arranged across the frame, springs between said bars and the supporting members of the rollers, and levers pivoted at their front ends to the frame and having adjustable connection with the bars aforesaid.

2. In an implement of the class described, the combination of a frame, supporting members pivoted at the front ends thereof to the frame, rollers carried by the rear ends of the supporting-bars aforesaid, bars arranged across the frame, springs between said bars and the supporting members of the rollers, levers pivoted at their front ends to the frame and having adjustable connection at their rear ends with the frame, and connecting means between the levers and the bars aforesaid.

3. In an implement of the class described, the combination of a frame, a pintle-bar mounted in the frame, supporting members pivoted at their front ends to the pintle-bar, rollers at the rear ends of the supporting members, adjusting-levers pivoted to the pintle-bars and arranged at opposite sides of the frame, connecting means between said adjusting-levers and the supporting members of the rollers, and means for adjusting the adjusting-levers.

4. In an implement of the class described, the combination of a frame, a pintle-bar mounted in the front portion of the frame, supporting members pivoted at their front ends to the pintle-bar and comprising spaced bars, blocks connecting the bars of each supporting member at a point between the ends thereof, rollers journaled between the spaced bars of each supporting member at the rear portions of the latter, adjusting-levers pivoted at their front ends to the pintle-bars and having adjustable connection at their rear ends with the frame, transverse bars extended across the frame and adjustably connected at the ends of the adjusting-levers aforesaid, and springs interposed between the transverse bars and the blocks of the supporting members of the rollers.

In testimony whereof I affix my signature in presence of two witnesses.

JOHN H. WOLF. [L. S.]

Witnesses:
 BURR W. JONES,
 E. J. B. SCHUBRING.